(12) United States Patent
Forbes et al.

(10) Patent No.: US 9,063,029 B2
(45) Date of Patent: Jun. 23, 2015

(54) DUMMY FOR SIMULATING HUMAN PHYSICAL BEHAVIOUR, METHOD FOR SIMULATING HUMAN PHYSICAL BEHAVIOUR

(75) Inventors: Patrick Alan Forbes, Amsterdam (NL); Robert Marijn Anthony Frank Verschuren, Eindhoven (NL); Arjan Pieter Teerhuis, Eindhoven (NL); Lex van Rooij, Eindhoven (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 1049 days.

(21) Appl. No.: 12/809,307

(22) PCT Filed: Dec. 19, 2008

(86) PCT No.: PCT/NL2008/050819
§ 371 (c)(1),
(2), (4) Date: Mar. 22, 2011

(87) PCT Pub. No.: WO2009/082211
PCT Pub. Date: Jul. 2, 2009

(65) Prior Publication Data
US 2011/0197688 A1     Aug. 18, 2011

(30) Foreign Application Priority Data
Dec. 21, 2007   (EP) ...................................... 07150304

(51) Int. Cl.
*G01M 7/08*    (2006.01)
*G01M 17/007*  (2006.01)
*G09B 23/32*   (2006.01)

(52) U.S. Cl.
CPC ............ *G01M 7/08* (2013.01); *G01M 17/0078* (2013.01); *G09B 23/32* (2013.01)

(58) Field of Classification Search
CPC ..... G01M 17/0078; G01M 7/08; G09B 23/32
USPC ......................................................... 73/865.6
See application file for complete search history.

(56) References Cited

U.S. PATENT DOCUMENTS

| | | | |
|---|---|---|---|
| 3,557,471 A |   | 1/1971  | Payne et al. |
| 3,562,925 A | * | 2/1971  | Baermann et al. ............ 434/265 |
| 3,740,871 A |   | 6/1973  | Berton et al. |
| 3,757,431 A | * | 9/1973  | Daniel .......................... 434/274 |
| 3,999,309 A | * | 12/1976 | Gonzalez ...................... 434/272 |
| 4,000,640 A |   | 1/1977  | Kocmich |
| 4,261,113 A |   | 4/1981  | Alderson |
| 4,500,564 A | * | 2/1985  | Enomoto ....................... 148/218 |
| 5,463,825 A |   | 11/1995 | Lo |

(Continued)

FOREIGN PATENT DOCUMENTS

EP             1519345             3/2005

*Primary Examiner* — Hezron E Williams
*Assistant Examiner* — Nashmiya Fayyaz
(74) *Attorney, Agent, or Firm* — Maryellen Feehery Hank; Reed Smith LLP

(57) ABSTRACT

A dummy for simulating human physical behaviour during a test, comprising artificial human body elements that are mutually connected, the body elements having deformation properties, wherein a deformation property of a body element is actuatably variable. The dummy comprises an actuator for varying a deformation property. The actuator may comprise a fluidic driver.

1 Claim, 9 Drawing Sheets

(56) References Cited

U.S. PATENT DOCUMENTS

Figure 1:
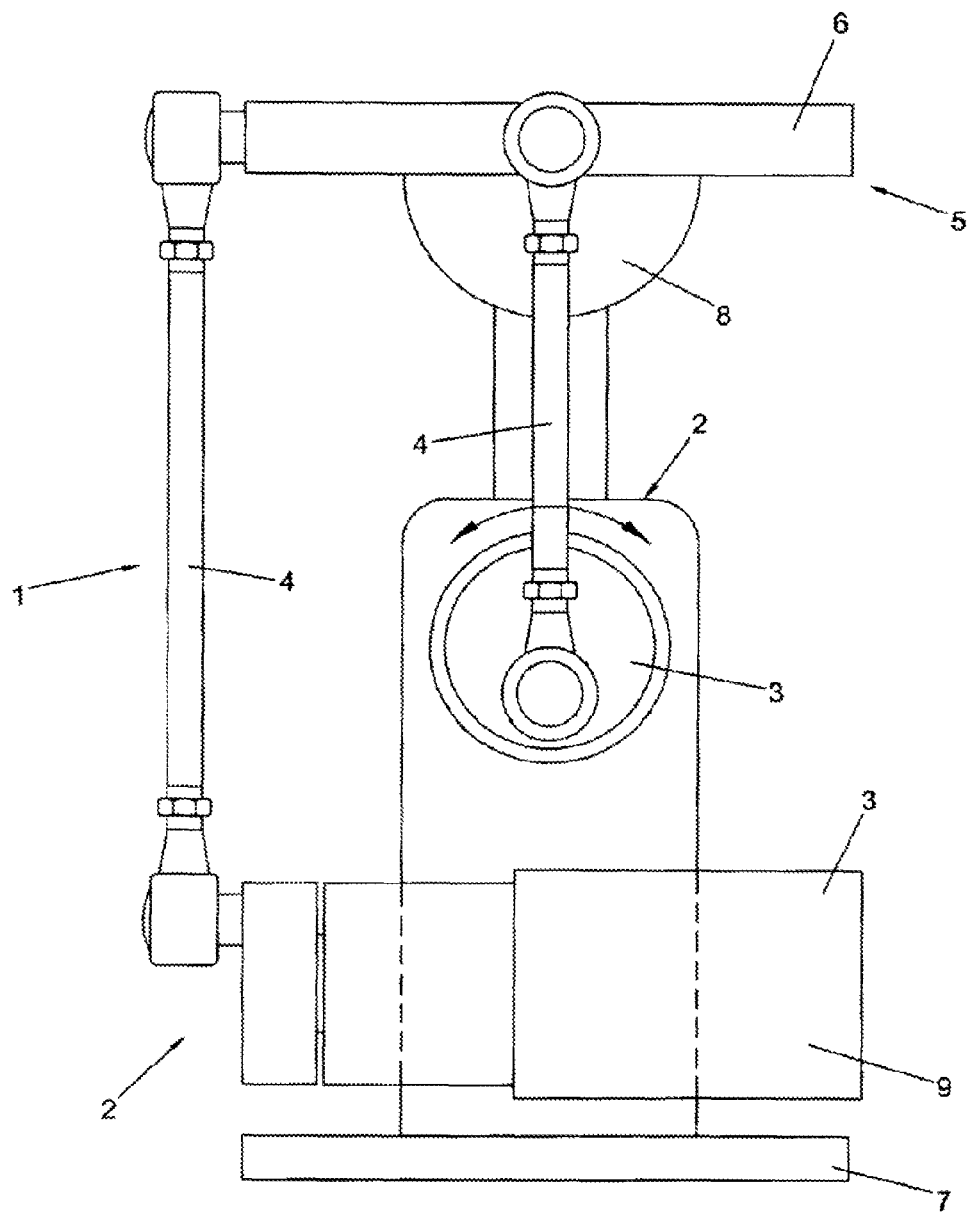

| | | | |
|---|---|---|---|
| 5,703,303 A * | 12/1997 | Stewart | 73/866.4 |
| 6,220,089 B1 * | 4/2001 | Gu et al. | 73/172 |
| 6,439,070 B1 | 8/2002 | Beebe et al. | |
| 6,633,783 B1 * | 10/2003 | Dariush et al. | 700/50 |
| 6,874,501 B1 * | 4/2005 | Estetter et al. | 128/205.15 |
| 7,508,530 B1 * | 3/2009 | Handman | 356/614 |
| 8,108,190 B2 * | 1/2012 | Riener et al. | 703/11 |
| 8,407,033 B2 * | 3/2013 | Cooper et al. | 703/6 |
| 2004/0254771 A1 * | 12/2004 | Riener et al. | 703/7 |
| 2005/0073496 A1 * | 4/2005 | Moore et al. | 345/156 |

* cited by examiner

DUMMY FOR SIMULATING HUMAN PHYSICAL BEHAVIOUR, METHOD FOR SIMULATING HUMAN PHYSICAL BEHAVIOUR

RELATED APPLICATIONS

This application is the United States National Stage of International Application No. PCT/NL2008/050819, filed Dec. 19, 2008, which was published as International Publication No. WO 2009/082211, and which claims benefit of European Patent Application No. 07150304.9 filed Dec. 21, 2007. Both applications are incorporated by reference in their entirety herewith.

The invention relates to a dummy for simulating human physical behaviour during a test, comprising artificial human body elements that are mutually connected, the body elements having deformation properties.

Such a dummy is widely known and is generally used in e.g. in acceleration tests such as crash tests for automobiles or ejection seats or active safety system-tests for testing active safety systems such as seat belts, resettable seats or air bags.

However, the conventional dummy does not provide an optimal simulation of the human physical behaviour, especially in the phase prior to a crash.

It is an object of the invention to provide a dummy that better simulates the human physical behaviour during the test.

Thereto, the invention provides a dummy for simulating human physical behaviour during a test, comprising artificial human body elements that are mutually connected, the body elements having deformation properties, wherein a deformation property of a body element is actuatably variable. The test can be an acceleration test and may comprise a pre-crash phase, a crash phase and/or a post-crash phase.

By providing a body element of which the deformation property is actuatably variable, the responses of that body element can become active instead of remaining passive. With an active response, also reflexive or voluntary human motion in particular in the phase prior to the crash can be simulated. Also the response of the human behaviour at the crash or during positioning of the active safety system can be better simulated. The deformation properties may be varied actively, adapted during the acceleration test so that the deformation properties of a body element may be actuatably varied in real time during the acceleration test. The deformation properties may be varied actively during the test itself and/or during different phases of the test.

By providing an actuator for varying a deformation property, such as e.g. a stiffness and/or damper property, wherein the actuator comprises a fluidic driver, the actuator can be simple and robust.

The driver comprises a driven element and a drive element, such as a motor. A fluidic driver comprises a fluidic driven element such as a pneumatic cylinder or a fluidic muscle. In particular, the fluidic muscle is a fluidic driver comprising a membrane enclosing a fluid chamber and having a first and second end, the membrane being pressurizable between a non-pressurized state wherein the ends are spaced apart with a first distance, and a pressurized state wherein the ends are spaced apart with a second distance, the second distance being smaller than the first distance. By providing a fluidic muscle, the actuator can become relatively light, flexible and compact.

By providing a fluid regulator as drive element of the fluidic driver for regulating fluid pressure in the fluid chamber of the fluidic muscle, the deformation property of the body element can be variable during the test.

By further providing a control system for controlling the actuator, not only the deformation properties of the body element during a test can be varied, but also the deformation properties can be adjusted depending on the kind of test that will be performed. Also, the control system may be configured to adapt the deformation properties in real time during the test.

By providing the driver of the actuator outside the body element, space can be saved in the body element, and the deformation properties of the body element can be varied remotely by the driver from outside the body element. This can result in a system that can be compact and that is relatively easy accessible for e.g. maintenance.

By providing a first and second substantially planar element whose mutual orientation and/or position is adjustable, an actuatable unit can be obtained for varying the deformation property of the body element.

By providing a pivotable joint for interconnecting the first and second planar element, the mutual orientation and/or position can be adjusted relatively easily. The joint can have e.g. a high torsional stiffness and a low bending stiffness to facilitate the adjustment of the planar elements with respect to each other.

By providing passive pulling elements of which a first end is connected to an actuator, and a second end of the passive pulling element is connected to the first and/or second substantially planar element, the driver can be easily placed outside the body element and the variation of the deformation properties is provided by the passive pulling elements, that are actively and remote driven by the driver.

The invention also relates to a method for simulating human physical behaviour during a test, comprising artificial human body elements that are mutually connected, the body elements having deformation properties, wherein a deformation property of a body element is actuatably variable.

Further embodiments of the invention are discussed below and are defined in the claims.

Figure 2:
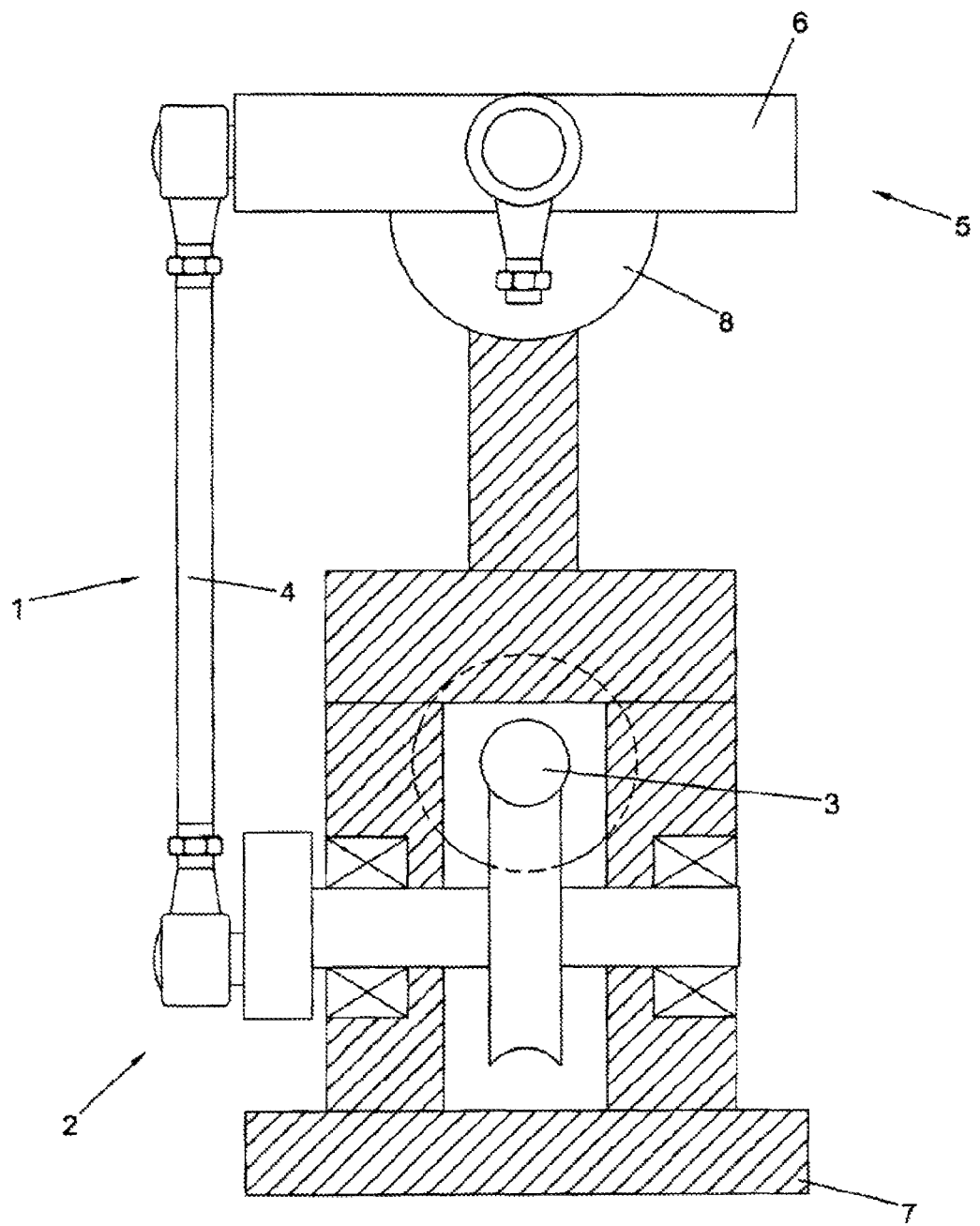
Figure 3:
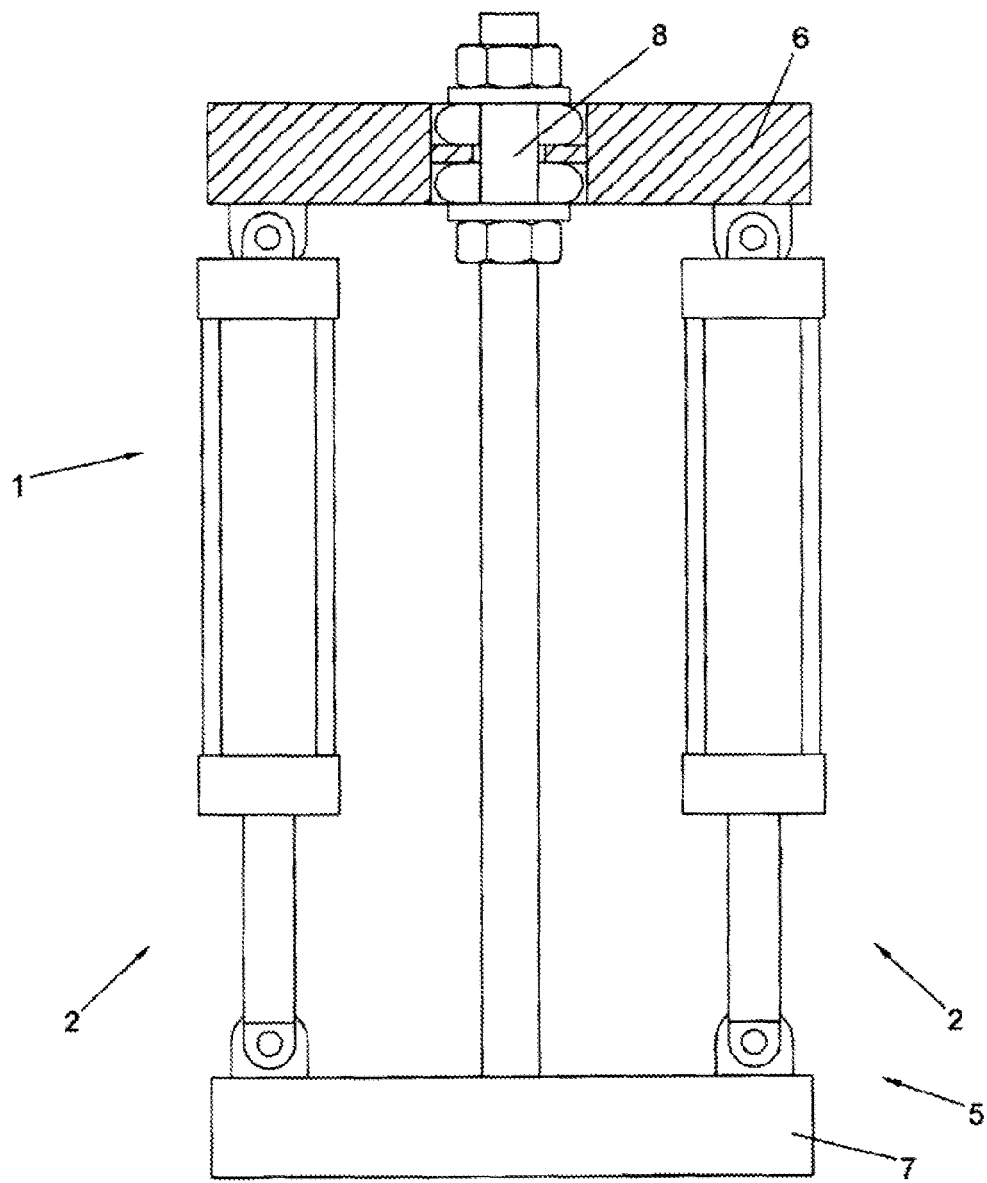
Figure 4:
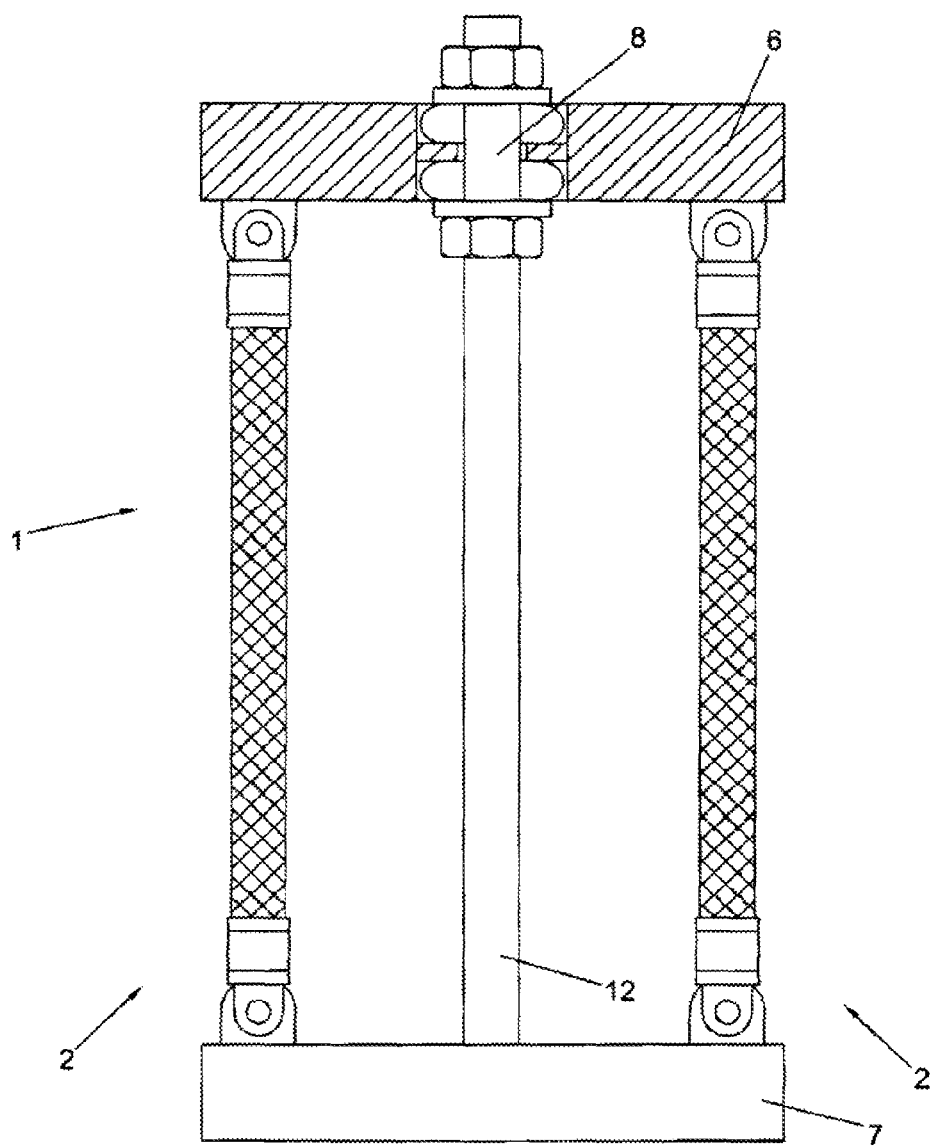
Figure 5:
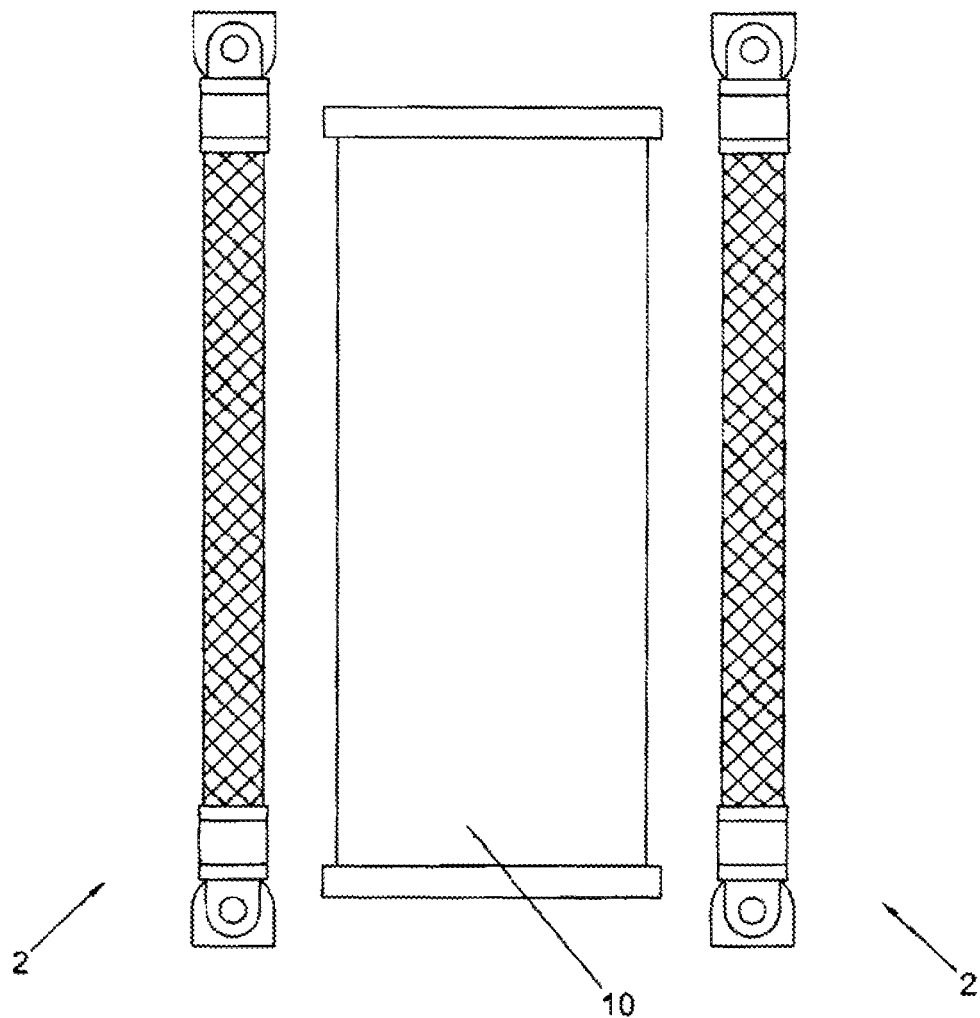
Figure 6:
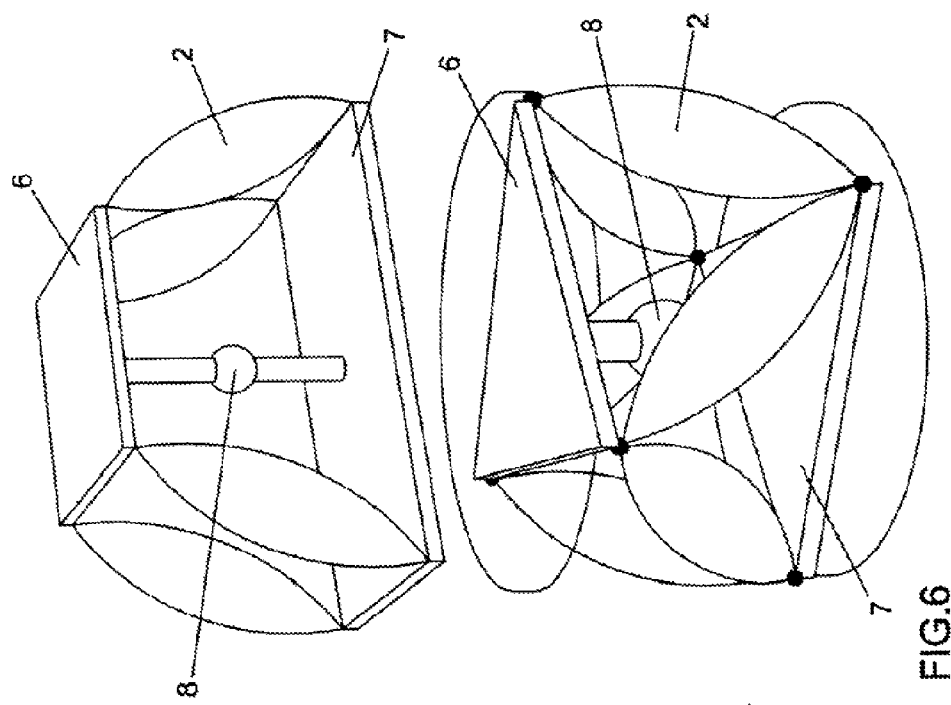
Figure 6:
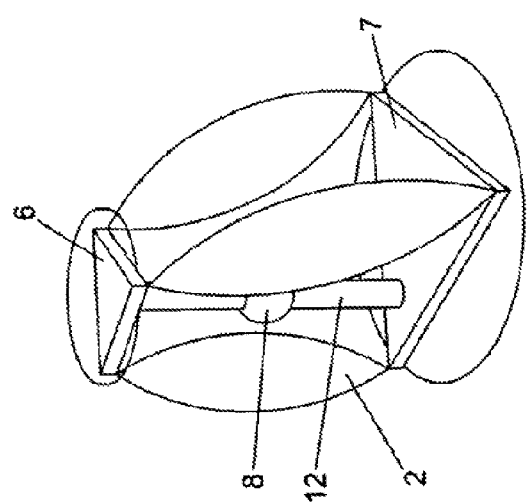
Figure 7:
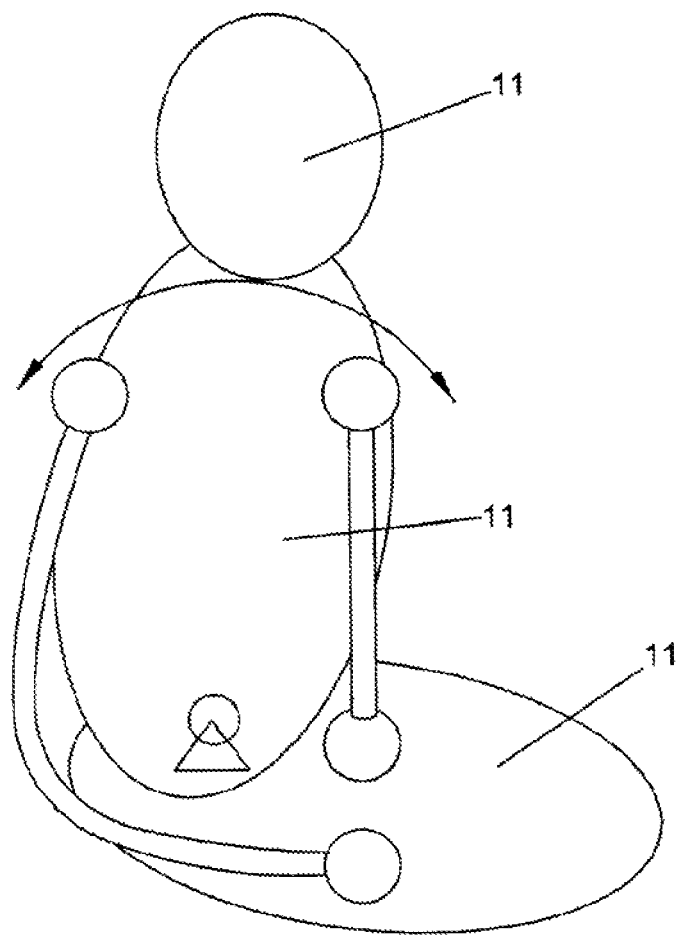
Figure 8:
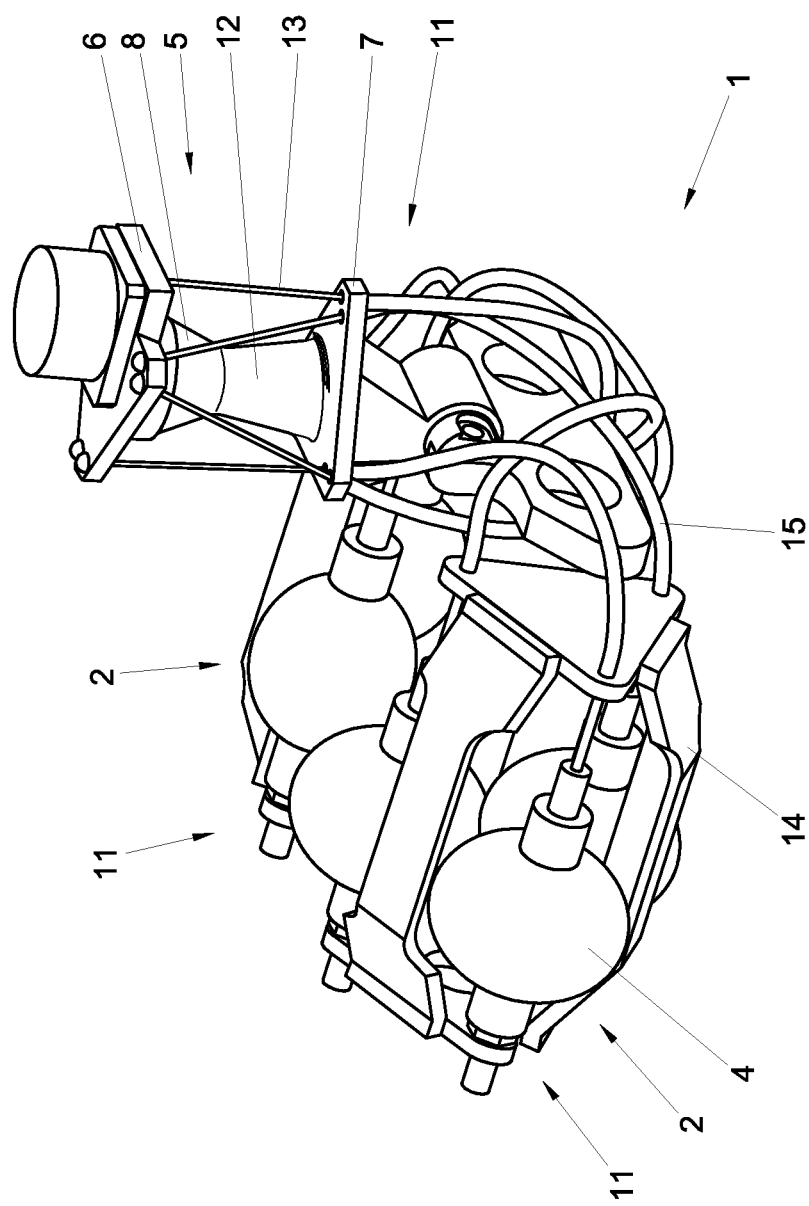
Figure 9:
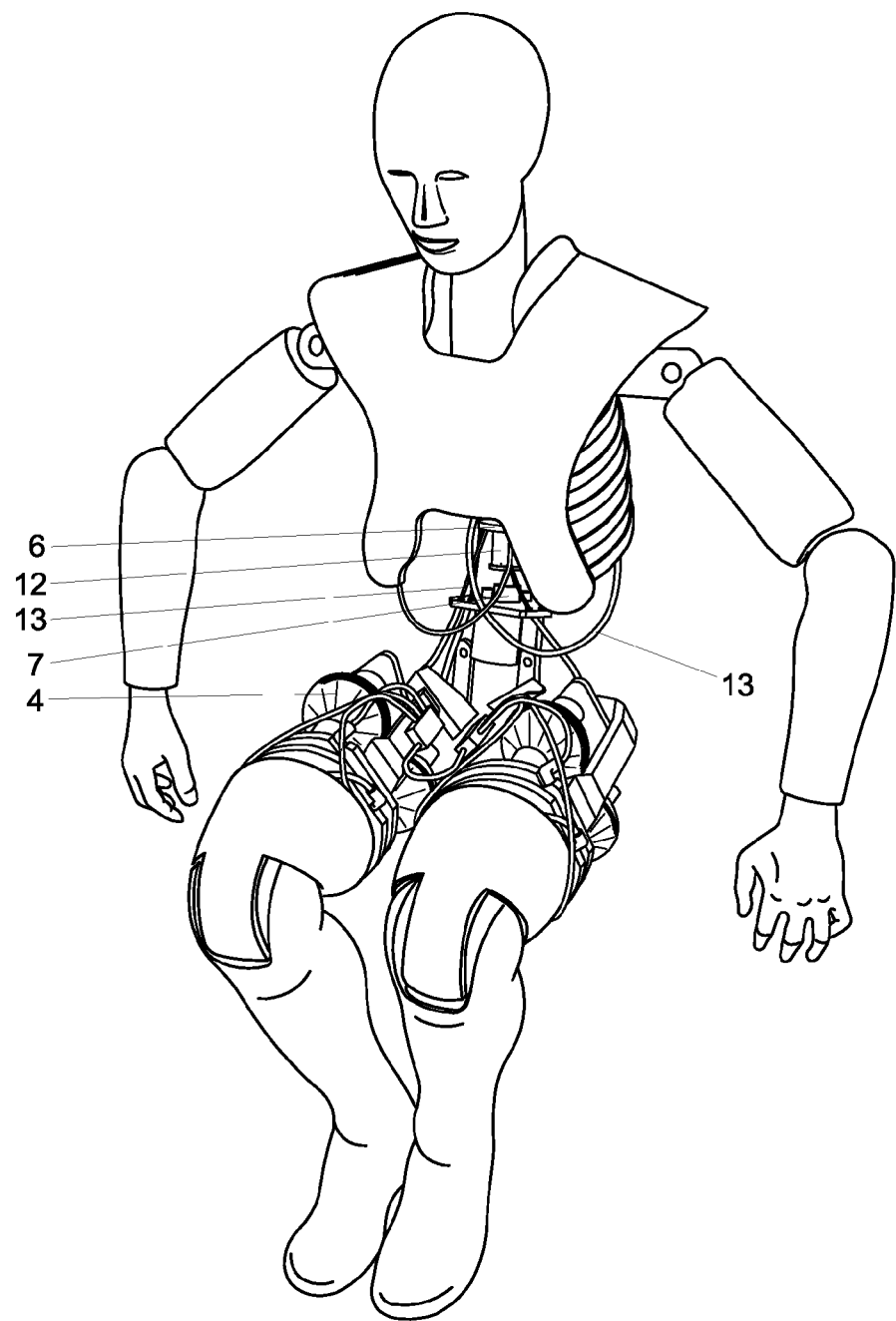

The invention shall be elucidated using a preferred embodiment shown in a drawing. In the drawing shows:

FIG. 1 a schematic view of a first embodiment of an actuator according to the invention;

FIG. 2 a schematic view of a second embodiment of an actuator according to the invention;

FIG. 3 a schematic view of a third embodiment of an actuator according to the invention;

FIG. 4 a schematic view of a fourth embodiment of an actuator according to the invention;

FIG. 5 a schematic view of a fifth embodiment of an actuator according to the invention;

FIG. 6 schematic perspective views of the third embodiment of an actuator according to the invention;

FIG. 7 a schematic view of a dummy according to the invention;

FIG. 8 a schematic perspective view of an actuator for implementation in the lumbar region; and FIG. 9 a schematic perspective view of a dummy with the actuator of FIG. 8 in the lumbar region.

The drawings are schematic representations of preferred embodiments and are given as non-limiting examples. In the drawings, identical or corresponding parts are denoted with the same reference numerals.

FIG. 1 shows a schematic view of an actuator 1 for varying a deformation property of a body element of a dummy. The actuator 1 can e.g. be incorporated in the lumbar spine unit of the dummy. However, other positions, e.g. neck region or legs could also be provided with an actuator.

The actuator 1 of FIG. 1 is an electric actuator, comprising drivers 2 and a base frame 5. The drivers 2 comprise a drive element 3 and a driven element 4. The drivers 2 are in this embodiment electric drivers 2 comprising an electric motor as drive element 3 and a rod as driven element 4. The motor 3 is via a gear box 9 connected to the rod 4. The actuator 1 can be incorporated in a body element of a dummy for simulating human physical behaviour during a test, such as a crash test or a position test. In this embodiment the drive element is an electric motor, but the drive element can also be a magnetic motor. The deformation property of a body element may thus be actuatably variable actively and/or in real time during the test. The test may be an acceleration test.

The electric drivers 2 are mounted in a base frame 5, the base frame 5 comprising first and second substantially planar elements 6 and 7 as the opposite sides of the base frame 5. A first and second end of the driver 2 are connected to the first and second planar element 6, 7. The mutual orientation of the first and second elements 6 and 7 with respect to each other are adjustable by the drivers 2. In the embodiment of FIG. 1 two electric drivers 2 are provided for adjusting the orientation in two degrees of freedom. Further a homokinetic joint 8 is provided for facilitating the adjustment of the orientation of the first and second elements 6, 7. The homokinetic joint 8 restricts the rotation around the standing axis of the base frame 5 in FIG. 1.

Instead of a homokinetic joint, a universal joint, a spherical joint or a local region with low bending stiffness and high torsional stiffness may be used.

By varying the orientation of the first and second elements 6, 7 with respect to each other, a deformation property, e.g. the stiffness and/or damping property, of the body element varies. By varying the stiffness and/or damping property of the body element, the dummy comprising the body element, can respond actively and/or in real time to a crash or pre-crash phase or an active safety system-test. This way the physical behaviour of a human during a crash can be better simulated during a crash test, which may comprise the pre-crash phase and the crash phase.

A control system is present for controlling the actuator 1. The response of the actuator 1 can thus be controlled in the phase prior to the crash, but also in the crash phase itself. This way, the response of the body element can be active, and/or in real time and the human physical behaviour can be better simulated. The deformation property of a body element may thus be actuatably variable in real time during the test. For example, reflexive or voluntary motion of the human can be taken into account by the control system. Also, it is possible to provide a feed-back-control system so the response of the actuator can e.g. react on the impact of the crash. The control system may be arranged for causing the actuator to exert a pull force when a measured signal is greater than a predetermined value. Usually the dummy is provided with measuring attributes for measuring physical parameters during the test. The signal(s) of the physical parameters may be measured by an acceleration, a velocity, a displacement and/or a force sensor.

FIG. 2 shows also a second embodiment of the actuator 1. The embodiment of FIG. 2 is an electric actuator using worm gears instead of a planetary gear box of the embodiment of FIG. 1.

FIG. 3 shows a third embodiment of an actuator 1. The actuator 1 comprises fluidic drivers 2 in a base frame 5. In this embodiment the fluidic drivers 2 comprise pneumatic cylinders as driven elements 4.

FIG. 4 shows a fourth embodiment of an actuator 1. The actuator 1 comprises two fluidic drivers 2 in the base frame 5. The fluidic drivers 2 comprise in this embodiment fluidic muscles as driven elements 4.

A fluidic muscle encloses a fluid chamber and has a first and second end, the membrane being pressurizable between a non-pressurized state wherein the ends are spaced apart with a first distance, and a pressurized state wherein the ends are spaced apart with a second distance, the second distance being smaller than the first distance. A fluidic muscle is generally known to the person skilled in the art. Compared to a pneumatic actuator a fluidic muscle is relatively light, compact and flexible. By using an actuator, such as e.g. a fluidic muscle, the deformation property of a body element may be actuatably variable in real time during the test. By varying the deformation property actively and/or in real time, a more optimal response of the body element, or the dummy comprising the body element, during an acceleration test may be obtained.

The fluidic drivers 2 can be driven by a fluid regulator 3—not shown—for regulating the fluid pressure in the fluid chamber.

Between the first and second planar element 6, 7, which form in this embodiment the opposing sides of the base frame 5, a connecting rod 12 is placed. The connecting rod 12 is connected to the first and second elements 6, 7 via the joints 8. In FIG. 4 only the joint 8 at the first planar element 6 is shown. Due to the stiffness of the connecting rod 12, the distance between the first and second planar elements 6, 7 remains more or less constant. Mainly the orientation of the first and second elements 6, 7 with respect to each other can be changed. The first and second elements 6, 7 will move around the joints 8. However, the connecting rod 12 can also be left out the base frame 5, so the distance between the first and second planar elements 6, 7 can be adjusted as well.

The connecting rod 12 can be replaced by flexible elements such as leaf springs made of steel or suitable plastics. The base frame 5 can for example be manufactured as one plastic piece comprising the first and second planar elements 6, 7 and the connecting element 12 with the flexible joint integrated in the material, e.g. as a flexible joint region with low bending stiffness and high torsional stiffness. This flexible joint region can be a region where the material is formed as a spring with a low bending stiffness and high torsional stiffness.

In FIG. 5 is shown that the fluidic muscles 2 can be attached directly to the body element, the base frame 5 can then be omitted. In this embodiment, the passive part 10 is still present in the body element. The passive part of a body element for passively simulating the human physical behaviour may comprise an elastic element, a damper element and/or a mass.

To save space in the body element for example, the drivers 2 of the actuator 1 can be placed outside the body element, as shown in FIG. 8 or FIG. 9. The deformation stiffness of the body element can be remotely varied by the drivers 2. In the body element, the base frame 5 can still be present and the deformation stiffness can be adjusted by passive pulling elements 13 in the body element 11. The passive pulling elements 13 can e.g. be steel cables or Bowden cables. The passive pulling elements are connected to the driver outside the body element and to the base frame inside the body element. For example a first end of the passive pulling element 13 can be connected to the driver, and a second end of the passive pulling element can be connected to the first and/or second substantially planar element 6, 7 of the base frame 5. In an other embodiment, the base frame can be left out the body element and the passive pulling elements can be connected directly to the body element for varying the deformation property.

FIG. 8 shows the base frame 5 with Bowden cables 13 connected to it for implementation in the body element representing the lumbar region. The drivers 2, comprising fluidic muscles 4 as driven elements, are placed in the body elements representing the left and right leg. The cables 13 are connected to the fluidic muscles 4, which are housed in a frame 14. When the fluidic muscles 4 are inflated and contract, the Bowden cables 13 are tensed and generate rotation of the joint 8. The fluidic muscle frames 14 and the base frame 5 are connected at the hip joint 15 in the dummy.

Adjusting the orientation of the opposing sides of the base frame 5, i.e. the first and second planar elements 6, 7, of the base frame 5 can be done in different degrees of freedom, depending on the number of drivers positioned between the opposite sides 6, 7 of the base frame 5. Also, the accuracy of adjusting the orientation improves by adding more drivers between the opposite sides 6, 7. FIG. 6 shows three embodiments with a different number of drivers 2, three, four and six drivers 2 respectively.

When all the drivers 2 placed in the base frame 5 actuated synchronically, the mutual orientation of the opposing sides of the base frame and/or of the first and second planar element remains more or less unchanged. In particular, when during a process of increasing a pull force of the drivers, respectively, the mutual orientation of the substantially planar element substantially remains more or less constant. This way the stiffness property can e.g. be varied, without varying the bending or torsion deformation property of the body element.

FIG. 9 shows a dummy with the actuator 1 shown in FIG. 8 incorporated is the lumbar region. The drivers 2 are placed in the upper part of the left and right leg. By using the drivers 2 which can be actuated real time during the test, the properties of the lumbar region may be varied real time. A prompt response to the behaviour of the dummy is possible during the test, thereby simulating human behaviour actively and in a more accurate way.

A schematic view of a dummy according to the invention is shown in FIG. 7. The dummy comprises three body elements 11, representing the head, trunk and legs respectively. Passive pulling elements 13 run from the trunk body element to the leg body element. The passive pulling elements 13 are connected to actuators 1 that are placed outside the dummy and therefore not shown here. By controlling the actuator 1, the tension on the cables 13 is changed, which changes the deformation stiffness of the dummy.

The dummy can be used during a test to simulate human physical behaviour. The test can be an acceleration test, such as a crash test which may comprise a pre-crash phase, a crash phase and sometimes a post-crash phase. The test can also be a position test for active safety systems such as active restraints. These are for example seat belts that pull a person (through belt tensioning) into an 'optimal' position for crash or resettable seats that position the seat of the person into an 'optimal' position for crash.

The invention is not limited to the embodiments described above. Many variations will be apparent to the skilled man and are within the scope of the invention as defined in the following claims.

The invention claimed is:

1. An acceleration test dummy for simulating human physical behaviour during an acceleration test, the acceleration test dummy comprising:
    artificial human body elements that are mutually connected, the body elements having deformation properties;
    at least one actuator for actuatably varying a deformation property of at least one of the body elements, the actuator comprising a fluidic driver; and
    a control system configured to receive feed-back from the at least one of the body elements, the control system being configured to control the actuator, wherein deformation properties of the at least one of the body elements are actively varied in real time during the acceleration test,
    wherein the fluidic driver comprises a membrane enclosing a fluid chamber and having a first and second end, the membrane being pressurizable between a non-pressurized state wherein the ends are spaced apart with a first distance, and a pressurized state wherein the ends are spaced apart with a second distance, the second distance being smaller than the first distance.

* * * * *